Sept. 28, 1937. P. J. HAYES Re. 20,520
STAMP RETAINING CLAMP
Original Filed Nov. 17, 1933
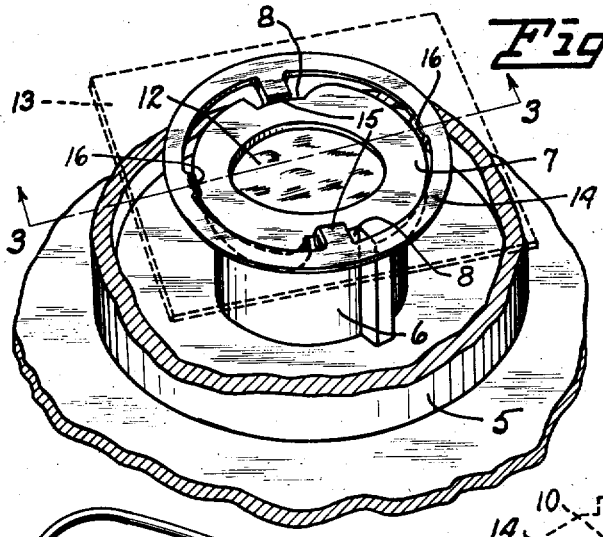
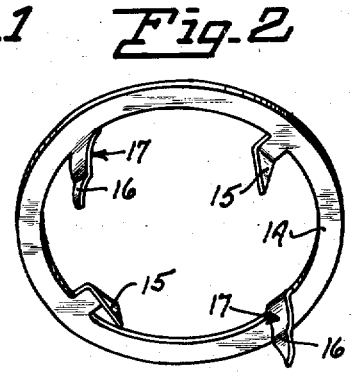
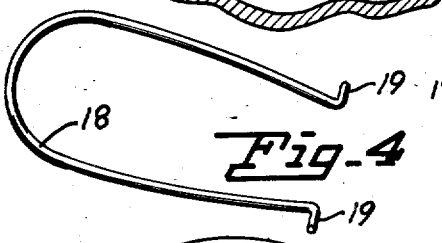
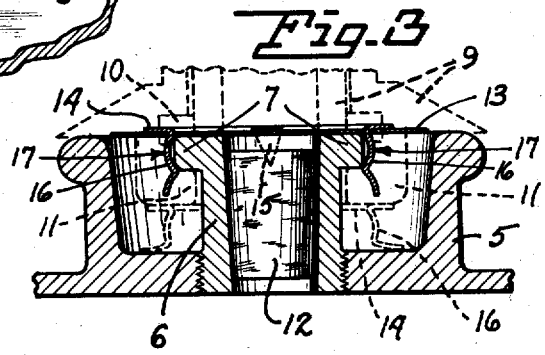
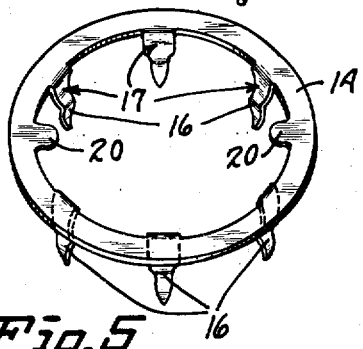
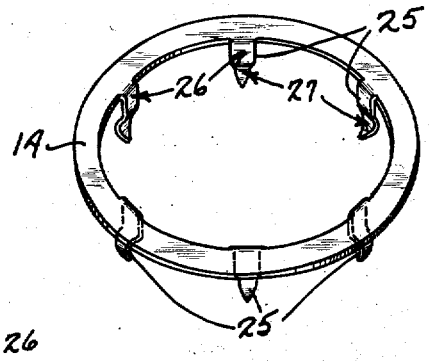
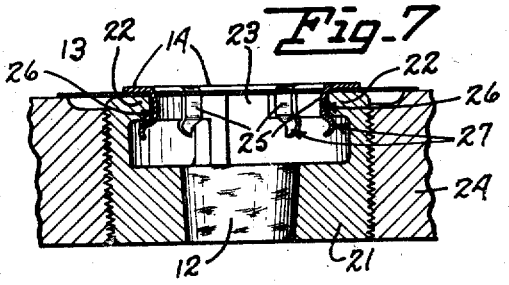
Inventor
Philip J. Hayes
By Glenn L. Fish
Attorney Reissued Sept. 28, 1937

Re. 20,520

UNITED STATES PATENT OFFICE 20,520

STAMP RETAINING CLAMP

Philip J. Hayes, Spokane, Wash., assignor to Acme Steel Company, Chicago, Ill., a corporation of Illinois Original No. 1,982,806, dated December 4, 1934, Serial No. 698,474, November 17, 1933. Application for reissue October 26, 1935, Serial No. 46,963

10 Claims. (Cl. 217—114)

My invention relates to stamp retaining clamps and certain objects of the invention are to provide a clamp that is adapted to retain a revenue or other stamp in place on the spout of a beer or other container. Further objects are to provide a clamp which may be stamped or punched from a single piece of metal and which may, therefore, be manufactured at comparatively small cost.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:—

Figure 1 is a view in perspective showing the device installed on the spout of a beer container and showing the stamp retained thereby in dotted lines;

Fig. 2 is a detail view in bottom perspective of the clamp;

Fig. 3 is a view in central vertical section taken on a broken line 3—3 of Fig. 1, and showing in dotted lines a beer tap connected to the spout whereby the clip is forced to a lowered position.

Fig. 4 is a detail view in perspective showing a tool that is ordinarily used in removing the clamp from the lowered position;

Fig. 5 is a detail view in perspective of a slightly modified form;

Fig. 6 is a detail view in perspective of a still further modified form adapted to fit another type of container; and Fig. 7 is a view in central vertical section showing the latter form in use.

Referring to the drawing throughout which like reference numerals indicate like parts, beer containers in present day use are provided with an upstanding spout housing 5 and a spout 6 centrally threaded into the housing. The top of the spout is disposed on a level with the top of the housing and is provided with an outwardly projecting flange 7 having oppositely disposed notches 8 provided therein. When the contents of the container are withdrawn, a tap 9, usually constructed as shown in Fig. 3, is used. Said tap is provided with an annular groove 10 which receives the flange 7, and projections 11 which are received by the notches 8 whereby the tap may be turned and thus form a tight connection with the spout. A cork 12 is used to plug the spout and is usually driven down into the container when the contents are withdrawn. It is now customary to seal the top of the spout 6 with a revenue stamp 13.

My invention consists essentially of a clamp comprising a ring 14 whose inner edge is adapted to slip over the flange 7 of the spout 6. Said ring is provided with a pair of oppositely disposed spur points 15 depending from its inner edge and inwardly offset therefrom whereby the distance between said points is substantially equal to the distance between the notches 8. Said ring is further provided with a pair of oppositely disposed spur clips 16 depending from its inner edge and disposed at right angles with the said spur points. Said spur clips are longer than the spur points and are curved or bowed outwardly as at 17.

The revenue stamp 13, being in place on top of the spout 6, is pierced by the spur points 15 and by the spur clips 16 when the device is installed. For this purpose, the spur points and spur clips are pointed as shown. Said spur points snugly enter the notches 8 and the spur clips snugly engage the outer edge of the flange 7 and, when said ring is pressed down the curved or bowed places 17 of the spur clips receive the outer edge of said flange thus holding the stamp down against the top of the spout as most clearly shown in Fig. 3 of the drawing. The flange of the spout thus forms a tangential abutment which is adapted to be engaged by the spur clips extending downwardly about it.

When the tap 9 is installed on the spout 6 the ring 14 is forced downward to the position shown in dotted lines in Fig. 3, and the stamp 13 is thereby mutilated. To remove the ring from this depressed position a tool such as shown in Fig. 4 may be used. Said tool comprises a bowed portion 18 which is used as a handle, and outwardly projecting ends 19 which are sprung under the inner edge of said ring, whereby the device may be removed from the spout.

In Fig. 5 is shown a slightly modified form. Here the ring 14 has a plurality of depending spur clips 16 which are likewise bowed outwardly as at 17, and which are pointed as shown, to penetrate the stamp. Two inwardly projecting lugs 20 are provided to engage the flange 7 and are for the purpose of preventing the device from being accidentally pressed down too far and thus mutilating the stamp 13 prematurely. By having a plurality of the depending spur clips 16, there is no need to get the ring 14 placed in any required position over the spout, for should two of the clips 16 perchance slip into the slots 8, there are a sufficient number remaining to engage the flange 7 securely.

There is another form of beer or beverage container in present day use in which the spout 21 is somewhat larger than the previous form and has an interior flange 22 and slots 23, said spout being threaded into the container 24. To fit this type a modified form of clip is required, said form being shown in Fig. 6.

This form comprises the usual ring 14 which is provided with a plurality of depending spur clips 25. Said spur clips are curved or bowed inwardly as at 26, and have outwardly curved pointed ends 27, thus holding the stamp down against the top of the spout as most clearly shown in Fig. 7 of the drawing. The clip is pressed out of such thin material that it does not interfere with the placing of the beer tap on the spout.

Having thus described my invention, it being understood that minor changes may be resorted to without departing from its scope, what I claim and desire to secure by Letters Patent of the United States is:—

1. The combination with an upstanding spout of a beverage container having an outwardly projecting top flange with notches therein, of a stamp retaining clamp comprising a ring adapted to fit over the flange, depending spur points formed on the inner edge of the ring and received in the notches of the flange, and depending spur clips formed on the inner edge of the ring and having outwardly curved portions snugly receiving the outer edge of the flange on the spout.

2. The combination with an upstanding spout of a beverage container having an outwardly projecting flange with notches therein, of a stamp retaining clamp comprising a ring having depending points to be received in the notches; and depending points adapted to receive the outer edge of the flange to retain the clamp on the spout.

3. A stamp retaining clamp comprising a ring, a plurality of short depending spur points inwardly offset from the inner edge of the ring, and a plurality of long spur clips depending directly from the inner edge of the ring, said spur clips having outwardly curved places therein.

4. A clamp for retaining a stamp on a spout comprising an open body having an opening through which the stamp may be seen, said body having a bearing surface for pressing against the stamp, and a plurality of resilient arms projecting from said body at an angle to said bearing surface and having pointed ends whereby said arms may penetrate said stamp, each of said arms being of sufficient length to have resilient action and being provided on the side thereof facing said opening with means comprising a projection for holding engagement with an abutment on said spout.

5. A clamp for retaining a stamp on a spout comprising a ring-like stamping of resilient material defining an opening through which a stamp may be seen and having integrally formed pointed spur clips depending from the inner marginal edge thereof, said spur clips being adapted to penetrate said stamp to permit the body of said stamping to seat on said stamp, said arms being each provided on the side thereof facing said opening with means for holding engagement with an abutment on the spout under the resilient action of the arm.

6. A clamp for retaining a stamp on a spout comprising a ring-like stamping of resilient material defining an opening through which a stamp may be seen and having integrally formed pointed spur clips depending from the inner marginal edge thereof, said spur clips being adapted to penetrate said stamp to permit the body of said stamping to seat on said stamp, said arms being each provided on the side thereof facing the opening with means adapted to engage the spout to hold said stamp and said clamp in place on said spout, said ring-like stamping being of such diameter that it may be pushed over said spout upon mutilation of said stamp.

7. In combination, a spout of a beverage container provided at its end with a transverse flange, a revenue stamp seated on the end of said spout, and a clamp comprising a ring-shaped body seated on said stamp and having resilient pointed spur clips of substantial length depending from the inner margin thereof and penetrating said stamp, said spur clips being provided on the sides thereof facing the spout with parts engaging said flange to hold said stamp and said clamp in position on said spout.

8. In combination, a beverage container having a spout provided around its end with a transverse flange and having an annular part spaced outwardly from said flange to form an annular recess around said spout, a revenue stamp seated on the end of said spout and extending outwardly beyond said flange over said recess, and a metal clamp comprising a ring-shaped body seated on said stamp and having pointed spur clips depending from the inner marginal edge thereof substantially parallel to the axis of said spout and in proximity to the outer edge of said flange, said spur clips penetrating said stamp and being provided with parts engaging said flange to hold said stamp and said clamp in position on said spout, said ring-shaped body being of such diameter that it may be forced into said recess upon mutilation of said stamp.

9. In combination, a beverage container having a spout and an annular recess around said spout, a revenue stamp seated on the end of said spout and extending outwardly beyond said spout over said recess, and a clamp in the form of a sheet metal stamping comprising a ring-shaped body portion seated on and supported by said stamp over said recess and having depending arms formed on the inner margin thereof, said arms penetrating said stamp and having inwardly projecting parts adapted to engage said spout to hold said stamp and said clamp in place, said clamp being adapted to be projected into said recess upon mutilation of said stamp.

10. In combination, a spout for a beverage container provided at its end with an outwardly extending flange, and a clamp comprising a ring-shaped body portion adapted to rest on and to be supported by a stamp seated on the end of said spout, said clamp having depending spur clips adapted to penetrate said stamp and provided with means to engage said flange and thereby hold said body portion and said stamp in place on said spout, said body portion being of such diameter that it may be pushed downwardly around said flange upon mutilation of said stamp.

PHILIP J. HAYES.